(12) United States Patent
Gupta et al.

(10) Patent No.: US 11,041,124 B2
(45) Date of Patent: Jun. 22, 2021

(54) BITUMEN SOLIDIFICATION AND PRILLING

(71) Applicant: Cenovus Energy Inc., Calgary (CA)

(72) Inventors: Subodh Gupta, Calgary (CA); Michael N. Holmes, Calgary (CA); Eric A. MacDonald, Calgary (CA); Jennifer D. Wood, Calgary (CA)

(73) Assignee: Cenovus Energy Inc., Calgary (CA)

( * ) Notice: Subject to any disclaimer, the term of this patent is extended or adjusted under 35 U.S.C. 154(b) by 139 days.

(21) Appl. No.: 16/135,811

(22) Filed: Sep. 19, 2018

(65) Prior Publication Data

US 2019/0016962 A1 Jan. 17, 2019

Related U.S. Application Data

(62) Division of application No. 15/334,134, filed on Oct. 25, 2016, now Pat. No. 10,106,745.

(Continued)

(51) Int. Cl.
*B01J 2/30* (2006.01)
*B01J 2/04* (2006.01)
(Continued)

(52) U.S. Cl.
CPC ............. *C10C 3/14* (2013.01); *B01F 5/205* (2013.01); *B01F 13/0227* (2013.01);
(Continued)

(58) Field of Classification Search
None
See application file for complete search history.

(56) References Cited

U.S. PATENT DOCUMENTS 3,026,568 A 3/1962 Moar
3,026,569 A 3/1962 Keller
(Continued)

FOREIGN PATENT DOCUMENTS

CA 905608 7/1972
CA 2149189 11/1995
(Continued)

OTHER PUBLICATIONS

Bhushan et al.. "Micro-, nano-and hierarchical structures for superhydrophobicity, self-cleaning and low adhesion." Philosophical Transactions of the Royal Society of London A: Mathematical, Physical and Engineering Sciences (2009): 1631-1672. 367.

(Continued)

*Primary Examiner* — Binu Thomas
(74) *Attorney, Agent, or Firm* — Knobbe Martens Olson & Bear LLP

(57) ABSTRACT

Methods, processes, and apparatuses for preparing and transporting bitumen. Bitumen may be prilled such that a bitumen product comprising a prill core and a non-stick coating is produced. The non-stick coating may comprise asphaltenes and the prill core may comprise bitumen, deasphalted oil, or both bitumen and deasphalted oil. The resultant non-stick coated prills have reduced adhesion to transportation vessels and other non-stick coated prills at a temperature below an adhesion temperature, facilitating transport.

9 Claims, 8 Drawing Sheets

Related U.S. Application Data

(60) Provisional application No. 62/246,556, filed on Oct. 26, 2015.

(51) Int. Cl.

| | | |
|---|---|---|
| *B01J 2/16* | (2006.01) | |
| *B01F 15/02* | (2006.01) | |
| *B01F 5/20* | (2006.01) | |
| *B01F 13/02* | (2006.01) | |
| *C10C 3/14* | (2006.01) | |
| *C08L 91/00* | (2006.01) | |
| *C08L 95/00* | (2006.01) | |
| *B01J 2/00* | (2006.01) | |
| *B01F 3/08* | (2006.01) | |
| *B01F 13/10* | (2006.01) | |

(52) U.S. Cl.
CPC ........... *B01F 15/0254* (2013.01); *B01J 2/006* (2013.01); *B01J 2/04* (2013.01); *B01J 2/16* (2013.01); *B01J 2/30* (2013.01); *C08L 91/00* (2013.01); *C08L 95/00* (2013.01); *B01F 3/0865* (2013.01); *B01F 2013/1094* (2013.01)

(56) References Cited

U.S. PATENT DOCUMENTS

| | | | | |
|---|---|---|---|---|
| 3,036,338 | A | * | 5/1962 | Nack ............ B01F 15/0254 264/7 |
| 3,207,824 | A | | 9/1965 | Wurster et al. |
| 3,232,166 | A | | 2/1966 | Matagne |
| 3,986,889 | A | | 10/1976 | Muntzer et al. |
| 4,082,823 | A | | 4/1978 | Augustine et al. |
| 4,572,781 | A | * | 2/1986 | Krasuk ............ C10G 21/003 208/309 |
| 4,769,288 | A | | 9/1988 | Saylak |
| 5,454,889 | A | | 10/1995 | Mcnicol et al. |
| 5,637,350 | A | * | 6/1997 | Ross ............ B01F 15/0254 264/13 |
| 6,361,682 | B1 | | 3/2002 | Moretta et al. |
| 6,793,964 | B2 | * | 9/2004 | Hoad ............ C08K 9/08 366/336 |
| 7,968,020 | B2 | | 6/2011 | Behelfer et al. |
| 8,221,105 | B2 | | 7/2012 | Behelfer et al. |
| 8,404,164 | B2 | | 3/2013 | Sockwell |
| 2013/0043462 | A1 | * | 2/2013 | Dilabio ............ C08L 95/00 257/40 |
| 2013/0098735 | A1 | * | 4/2013 | Corscadden ............ C10G 9/00 196/14.52 |
| 2014/0246357 | A1 | * | 9/2014 | Corscadden ............ C10G 21/30 208/309 |

FOREIGN PATENT DOCUMENTS

| | | |
|---|---|---|
| CA | 2178053 | 12/1996 |
| CA | 2302429 | 4/1999 |
| CA | 2326213 | 5/2009 |
| CA | 2373558 | 8/2011 |
| CA | 2789921 | 8/2011 |
| CA | 2797085 | 11/2011 |
| CA | 2814240 | 4/2012 |
| WO | WO 2005/081775 | 9/2005 |

OTHER PUBLICATIONS

Billon, et al., Converting residues with IFP's hyvahl and solvahl processes, Rev. Inst. Fr. du Pét. 1994, 49 (05), 495-507.

Brownstein, Martin, "Radioactive Waste Solidification," ASME Short Course, Radioactive Waste Management, For Nuclear Power Reactors and Other Facilities, (1991), 1-33.

Foster Wheeler, Solvent Deasphalting, http://apps.fwc.com/What-We-Do/Refining/FW-Residue-Upgrading-Technologies/Solvent-Deasphalting.aspx (date printed unknown). 1-2.

Gutiérrez, Luis B., et al. "Fractionation of asphaltene by complex formation with p-nitrophenol. A method for structural studies and stability of asphaltene colloids." Energy & Fuels (2001): 624-628, 15.3, American Chemical Society.

Houde, et al. "When solvent deasphalting is the most appropriate technology for upgrading residue." Proceedings of the International Downstream Technology & Strategy (IDTC) Conference, 2006, 1-11.

Mehrez, et al., "Study on heat and mass transfer during urea prilling process," International Journal of Chemical Engineering and Applications, (2012) vol. 3, No. 5, pp. 347-353.

Morrissy, et al. "Micromechanical Cohesive Force Measurements between Precipitated Asphaltene Solids and Cyclopentane Hydrates." Energy & Fuels (2015): 29.10, 6277-6285, American Chemical Society.

Perry et al., Chemical Engineers' Handbook, 5th Edition, , (1973) Section 5 Fluid and Particle Dynamics, pp. 5-61 to 5-65, New York: McGraw-Hill, Inc.

Rayleigh, Lord "On the capillary phenomena of jets," Proceedings of the Royal Society of London, (1879) pp. 71-97, vol. 29 No. 196-199.

Rolo, et al. "Surface tension of heptane, decane, hexadecane, eicosane, and some of their binary mixtures." Journal of Chemical and Engineering Data (2002): 1442-1445. 47.6, American Chemical Society.

Saleh, et al. "Basic design methodology for a prilling tower." The Canadian Journal of Chemical Engineering (2015), 1403-1409, 93. Issue 8.

Sandvik, Sandvik Capabilities in the petrochemical industry, (Jun. 2004), Company publication by Sandvik, Germany.

Stastny, R.P, "Bitbricks", Transportation Technology, (Mar. 30, 2015), pp. 60., vol. 10.

Van Hoeve, et al., "Breakup of diminutive Rayleigh jets," Physics of Fluids, (2010), 122003-1-122003-11, vol. 22.

* cited by examiner

BITUMEN SOLIDIFICATION AND PRILLING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a divisional application of U.S. application Ser. No. 15/334,134, filed Oct. 25, 2016, which, in turn, claims the benefit of priority from U.S. Provisional Patent Application No. 62/246,556, filed Oct. 26, 2015, both of which are herein incorporated in their entireties.

FIELD OF INVENTION

The present invention relates generally to methods, processes, and apparatuses for preparing bitumen, and to prepared bitumen. More specifically, the present invention relates to methods, processes, and apparatuses for preparing non-stick coated prills comprising bitumen, deasphalted oil, or a combination thereof for transport, and to non-stick coated prills.

BACKGROUND

Bitumen is a highly viscous form of petroleum which is widely produced in the oil and gas industry. Large natural deposits of bitumen may be found, for example, in Canadian oil sands. The high viscosity of bitumen is at least partly due to the asphaltenes content of bitumen, which can complicate the recovery and transportation of bitumen. Increasing energy demands worldwide mean that accessible heavy or viscous oils, such as bitumen, will become increasingly important sources of energy moving forward, despite the challenges associated with recovery and transportation.

Bitumen is commonly transported by either rail or pipeline infrastructure. However, the sticky and high viscosity nature of bitumen presents challenges in both cases, complicating removal of bitumen from rail cars and reducing pipeline flowability requiring the use of costly diluent.

A need exists for methods and/or apparatuses for preparing bitumen for transport given the increased demand for energy.

SUMMARY OF INVENTION

In one embodiment, there is provided herein a method for preparing a non-stick coated prill, the method comprising:
  generating a prill core comprising bitumen, deasphalted oil (DAO), or a combination thereof; and
  coating the prill core with a non-stick coating comprising asphaltenes, the non-stick coating having reduced adhesion to another non-stick coated prill at a temperature below an adhesion temperature.

In another embodiment of the method above, the prill core may comprise up to 100% DAO.

In a further embodiment of any of the method or methods above, at least some of the asphaltenes of the non-stick coating may be asphaltenes separated from a bitumen or DAO prior to using the bitumen or DAO for generating the prill core.

In another embodiment, there is provided herein a method for transporting bitumen, the method comprising:
  generating a non-stick coated prill comprising a prill core and a non-stick coating, the prill core comprising bitumen, deasphalted oil (DAO), or a combination thereof, and the non-stick coating comprising asphaltenes; and
  transporting the non-stick coated prill in a transportation vessel;
  the non-stick coated prill having reduced adhesion to the transportation vessel or another non-stick coated prill at a temperature below an adhesion temperature.

In a further embodiment of the method above, the prill core may comprise up to 100% DAO.

In still a further embodiment of any of the method or methods above, at least some of the asphaltenes of the non-stick coating may be asphaltenes separated from a bitumen or DAO prior to using the bitumen or DAO for generating the prill core.

In yet another embodiment of any of the method or methods above, the adhesion temperature may be about 162° C.

In another embodiment of any of the method or methods above, the adhesion temperature may be above an ambient transportation temperature.

In yet another embodiment, there is provided herein a prilling process for generating a non-stick coated prill, the prilling process comprising:
  introducing bitumen, deasphalted oil (DAO), or a combination thereof, into a prilling vessel and forming a prill core comprising bitumen, DAO, or a combination thereof; cooling the prill core; and
  coating the prill core with a non-stick coating, wherein the non-stick coating comprises asphaltenes, the non-stick coating having reduced adhesion to another non-stick coated prill at a temperature below an adhesion temperature.

In another embodiment of the prilling process above, the prill core may comprise up to 100% DAO.

In still another embodiment of any of the prilling process or prilling processes above, at least some of the asphaltenes of the non-stick coating may be asphaltenes separated from a bitumen or DAO prior to using the bitumen or DAO for forming the prill core.

In yet another embodiment, there is provided herein a non-stick coated prill comprising:
  a prill core comprising bitumen, deasphalted oil (DAO), or a combination thereof; and
  a non-stick coating comprising asphaltenes, the non-stick coating having reduced adhesion to another non-stick coated prill at a temperature below an adhesion temperature.

In a further embodiment of the non-stick coated prill above, the non-stick coated prill is prepared by:
  generating a prill core comprising bitumen, deasphalted oil (DAO), or a combination thereof; and
  coating the prill core with a non-stick coating comprising asphaltenes, the non-stick coating having reduced adhesion to another non-stick coated prill at a temperature below an adhesion temperature.

In a further embodiment of the non-stick coated prill above, at least some of the asphaltenes of the non-stick coating are asphaltenes separated from a bitumen or DAO prior to using the bitumen or DAO for generating the prill core.

In a further embodiment of the non-stick coated prill above, the non-stick coated prill is prepared by:
  introducing bitumen, deasphalted oil (DAO), or a combination thereof, into a prilling vessel and forming a prill core comprising bitumen, DAO, or a combination thereof;

cooling the prill core; and coating the prill core with a non-stick coating, wherein the non-stick coating comprises asphaltenes, the non-stick coating having reduced adhesion to another non-stick coated prill at a temperature below an adhesion temperature.

In a further embodiment of the non-stick coated prill above, the prill core may comprise up to 100% DAO.

In still another embodiment, there is provided herein an apparatus for preparing a non-stick coated prill, the apparatus comprising:

a prilling vessel having an upper section and a lower section;

a first inlet for inputting bitumen, deasphalted oil (DAO), or a combination thereof, in the upper section of the prilling vessel and forming a prill core;

a second inlet for inputting a carrier gas to the lower section of the prilling vessel for cooling the prill core;

a first outlet for discharging the carrier gas from the upper section of the prilling vessel;

a third inlet for inputting a non-stick coating material for coating the prill core; and a second outlet for outputting the non-stick coated prill.

In another embodiment of the apparatus above, the first inlet may comprise a nozzle or prilling head.

In still another embodiment of any of the apparatus or apparatuses above, the apparatus may be configured to cool the prill core from about 180° C. at the upper section of the prilling vessel to about 30° C. at the lower section of the prilling vessel.

In yet another embodiment of any of the apparatus or apparatuses above, the apparatus may be configured for operating using a jetting regime.

In yet another embodiment of any of the apparatus or apparatuses above, the apparatus may be configured for operating using a jetting regime wherein a liquid Weber number is ≥8, and a gas Weber number is ≤0.4.

In another embodiment of any of the method or methods above, the non-stick coating may comprise asphaltenes applied to the prill core as a powder, as a liquid which subsequently solidifies, as a solvent-diluted asphaltenes solution which subsequently solidifies, or a combination thereof.

In yet another embodiment of any of the method or methods above, the non-stick coating may comprise asphaltenes applied as toluene-diluted asphaltenes.

In another embodiment of any of the prilling process or processes above, the non-stick coating may comprise asphaltenes applied to the prill core as a powder, as a liquid which subsequently solidifies, as a solvent-diluted asphaltenes solution which subsequently solidifies, or a combination thereof.

In yet another embodiment of any of the prilling process or processes above, the non-stick coating may comprise asphaltenes applied as toluene-diluted asphaltenes.

In another embodiment of any of the non-stick coated prill or prills above, the non-stick coating may comprise asphaltenes applied to the prill core as a powder, as a liquid which subsequently solidifies, as a solvent-diluted asphaltenes solution which subsequently solidifies, or a combination thereof.

In yet another embodiment of any of the non-stick coated prill or prills above, the non-stick coating may comprise asphaltenes applied as toluene-diluted asphaltenes.

In another embodiment of any of the apparatus or apparatuses above, the third inlet may be for inputting a non-stick coating material comprising asphaltenes for coating the prill core as a powder, as a liquid which subsequently solidifies, as a solvent-diluted asphaltenes solution which subsequently solidifies, or a combination thereof.

In yet another embodiment of any of the apparatus or apparatuses above, the third inlet may be for inputting a non-stick coating material comprising asphaltenes for coating the prill core as a toluene-diluted asphaltenes.

In yet another embodiment of any of the non-stick coated prill or prills above, a thickness of the non-stick coating may be uniform, substantially uniform, or non-uniform about the exterior of the prill core.

In still another embodiment of any of the non-stick coated prill or prills above, a coverage of the prill core by the non-stick coating may be uniform, substantially uniform, or non-uniform about the exterior of the prill core.

BRIEF DESCRIPTION OF DRAWINGS

It will be appreciated that the following drawings are provided for illustrative purposes intended for those skilled in the art, and are not meant to be limiting in any way.

FIG. 3A depicts one example of the methodology, asphaltenes were separated from bitumen, and further resolved into A1 and A2 asphaltenes. FIGS. 3B-D depict an example where Asphaltene adhesion temperature analysis was performed by gently rolling asphaltene particles in a flask immersed in a slowly heated mineral oil bath; temperature was monitored, and the temperature at which particles were observed to be adhering to each other was recorded as the adhesion temperature;

FIGS. 6A-D shows a series of graphs illustrating examples of potential effects of varying a variety of prill and prilling tower factors, wherein FIG. 6A shows a prill temperature profile; FIG. 6B shows tower height and diameter at varying prill diameter; FIG. 6C shows tower height and diameter at varying air velocity; and FIG. 6D shows tower height and diameter at varying air temperature.

DETAILED DESCRIPTION

Figure 1:
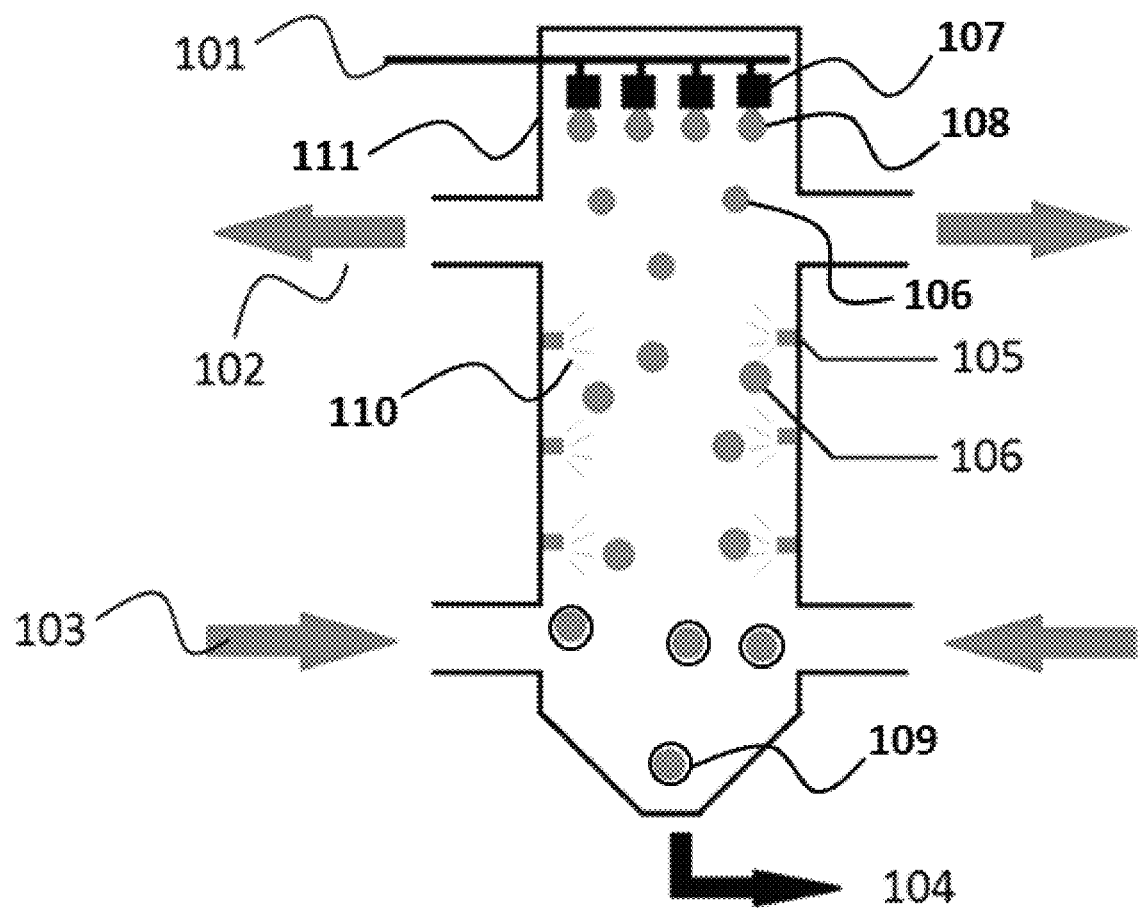
FIG. 1 shows a schematic illustrative of one embodiment of an apparatus suitable for carrying out methods for generating a non-stick coated prill.

Described herein are examples and embodiments of methods, processes, and apparatuses for preparing bitumen, and of bitumen preparations and products. It will be appreciated that embodiments and examples are provided herein for illustrative purposes intended for those skilled in the art, and are not meant to be limiting in any way. All references to embodiments or examples throughout this disclosure should be considered as references to illustrative and non-limiting embodiments and illustrative and non-limiting examples.

The person of skill in the art will be aware of conventional apparatuses, methods, and techniques for generating prills. Prilling, for example, is used extensively in the fertilizer industry for generating urea prills. The following embodiments and examples involve the use of prilling methods and apparatuses for generating prills and prill cores. It will, however, be recognized by the person of skill in the art having regard to the teachings herein that, in certain embodiments, references herein to prilling methods and apparatuses may be understood as also encompassing suitable prilling method and apparatus variants such as any suitable granulation or pelletization method and apparatus. Conventional granulation and pelletization apparatuses, methods, and techniques for generating granules and pellets, respectively, are well-established in the art. Furthermore, the person of skill in the art will similarly recognize that, in certain embodiments, references herein to a prill or prill core may be understood as also encompassing other suitable prill or prill core variants as will be known to the person of skill in the art having regard to the teachings herein, including any suitable pellet, granule, or particle.

Examples of apparatuses and methods for prilling and/or pelletizing are discussed in, for example, U.S. Pat. Nos. 3,026,568, 4,082,823, and 7,968,020, and Canadian Patent/Application nos. 2,797,085 and 2,326,213, each of which is herein incorporated by reference in their entirety.

Generally speaking, prilling techniques may be performed in prilling vessels such as prilling towers. A material to be prilled is heated to above a melting temperature of the material and fed into the top of the prilling vessel in a molten state via a prilling head, prilling nozzle, or prilling injector which generates droplets forming droplet-shaped prills of substantially uniform size. The prills fall through the prilling vessel while being cooled by a counter-current flow of a carrier gas, such as methane, air, or nitrogen. The falling prills are cooled to a temperature below their melting temperature, thus hardening or solidifying. The hardened or solidified prills can then be collected from the bottom of the prilling vessel. Further discussion of prilling apparatuses may be found in S. N. Saleh, et al., (2015) Basic Design Methodology for a Prilling Tower, *The Canadian Journal of Chemical Engineering*, Vol. 93, 1403-1409, which is herein incorporated by reference in its entirety.

Conventional prilling is typically used to produce a solidified or hardened product. Application of prilling to materials and substances which become very viscous or semi-solid at decreased temperatures, rather than solidified or hardened, presents challenges to conventional prilling apparatuses and methods because the produced prills may adhere to one another, thereby sticking or agglomerating with one another at the bottom of the prilling vessel.

An example of a prilling apparatus, also known as a prilling vessel or prilling tower, and method for producing non-stick coated prills in accordance with embodiments of the present invention is described with reference to the illustrative schematic provided in FIG. 1. In the illustrated schematic, a prilling apparatus is provided which comprises a prilling vessel (111) having an upper section and a lower section. The illustrated prilling apparatus further comprises a first inlet (101) for inputting bitumen, DAO, or a combination thereof (108) to the upper section of the prilling vessel (111). In certain embodiments, the bitumen may be input in, for example, a molten state, or in a solvent-diluted state in which the bitumen is at least partially diluted in a solvent such as, for example, DAO. The first inlet (101) may comprise one or more nozzles (107) (or any other suitable component such as a jet, sprayer, prilling injector, or prilling head) for controlling or directing the input of bitumen, DAO, or a combination thereof (108) so as to form generally spherical or droplet-shaped prill cores (106). In certain embodiments, the nozzles (107) may be configured to operate in a jetting regime (further described below with respect to FIG. 5), defined by a liquid Weber number of greater than or equal to 8 and a gas Weber number of less than or equal to 0.4. The Weber number represents a ratio of a fluid's inertia and its surface tension [1].

The prilling apparatus in FIG. 1 further comprises a second inlet (103) positioned at a lower section of the prilling vessel for inputting a carrier gas to the lower section of the prilling vessel, and a first outlet (102) positioned at an upper section of the prilling vessel for discharging the carrier gas from the upper section of the prilling vessel. The carrier gas is for cooling the prill core, and may be or comprise any suitable gas such as, for example, methane, air, or nitrogen. Movement of the carrier gas from the second inlet (103) to the first outlet (102) produces a counter-current flow of the carrier gas from the lower section of the prilling vessel to the upper section of the prilling vessel. The carrier gas flowing past the falling prill cores (106) cools the prill cores. It will be understood that the prill cores initially formed at the upper section of the prilling vessel (111) following discharge of the bitumen, DAO, or a combination thereof (108) from the nozzles (107) may be substantially molten, and that the cooling effect of the carrier gas serves to cool the prill cores (106) such that by the time the prill cores (106) reach the lower section of the prilling vessel (111), they have become more viscous, semi-solid, or even substantially solidified or hardened.

As the prill cores (106) fall from the upper section of the prilling vessel toward the lower section, they encounter one or more third inlets (105) for inputting a non-stick coating material for coating the prill cores (106). In certain embodiments, where appropriate, the third inlets (105) may be positioned so as to apply the non-stick coating to the prill cores (106) as soon as the prill cores have formed, upon reaching the lower section of the prilling vessel (111), or at any suitable position therebetween. In the embodiment illustrated in FIG. 1, the third inlets (105) are positioned so as to apply the non-stick coating to the prill cores (106) about mid-way through their passage from the upper section to the lower section of the prilling vessel (111), a point at which the prill cores (106) have at least partially or even substantially cooled and viscosified. The third inlets (105) may comprise one or more nozzles (or any other suitable component such as a jet or sprayer) to produce a spray of non-stick coating material (110), which coats the exterior of the prill cores (106), thereby forming non-stick coated prills (109) comprising a prill core (106) which is coated with the non-stick coating. The non-stick coated prills reach the lower section of the prilling vessel (111), and can be collected from a second outlet (104) for outputting the non-stick coated prills.

The person of skill in the art having regard to the teachings herein will be able to select third inlet (105) configurations which are suitable for the particular prill core composition, non-stick coating composition, and prilling vessel conditions being used. By way of example, a third inlet for inputting a non-stick coating material which is a liquid may comprise a nozzle, jet, or sprayer for applying the non-stick coating material to a prill core as a spray. A third inlet for inputting a non-stick coating material which is a powder may, for example, comprise a nozzle or other suitable input line for introducing the powder into the prilling vessel along with a carrier or dispersing gas.

In the illustrated embodiment, the non-stick coated prills (109) at the lower section of the prilling vessel (111) comprise a semi-solid or high viscosity prill core comprising bitumen, DAO, or a combination thereof, and a non-stick coating comprising asphaltenes. Although the prill cores of the non-stick coated prills (109) illustrated at the lower section of the prilling vessel in FIG. 1 are substantially semi-solid or highly viscous in nature, it will be understood that in other embodiments such as those wherein the prill core substantially comprises DAO, the prill core of the non-stick coated prills (109) may be less viscous or even substantially liquid in nature depending on the temperature or other conditions of the prilling vessel. In examples where the prill core does not reach a high viscosity or semi-solid state within the conditions of the prilling vessel, the non-stick coating may be selected and applied so as to provide both non-stick character and a hardened outer containment shell to the prill core (106).

It will additionally be understood that the viscosity of the prill core (106) may increase as temperature decreases. Therefore, cooling of the prill core (106) within the prilling vessel (111) may be increased in order to accommodate less viscous prill core compositions. In embodiments where the prill core substantially comprises DAO, it may be possible to substantially solidify the prill core if a low enough temperature is used. Furthermore, the prilling apparatus may be configured to cool the prill cores (106) in accordance with the particular properties of the particular non-stick coating material being applied.

In certain embodiments, the prilling apparatus may be configured to cool the prill cores from about 180° C. at the upper section to produce non-stick coated prills at about 30° C. at the lower section of the prilling vessel. For certain non-stick coating materials that are not water soluble, a cooling water bath may be positioned at the bottom of the prilling vessel to further cool the non-stick coated prills.

In certain embodiments, non-stick coated prills and non-stick coatings as referred to herein may encompass those which have reduced adhesion to other non-stick coated prills, to other surfaces, or a combination thereof, as compared to a comparable prill core or prill which is not coated with the non-stick coating while at a temperature which is below the adhesion temperature of the non-stick coated prill or the non-stick coating.

In certain embodiments, non-stick coated prills and non-stick coatings as referred to herein may encompass those which, while at a temperature which is below the adhesion temperature of the non-stick coated prill or the non-stick coating, have reduced adhesion to other non-stick coated prills, to other surfaces, or a combination thereof, as compared to the same non-stick coated prill or non-stick coating while at a temperature which is above said adhesion temperature. It will be understood that the adhesion temperature of a particular non-stick coated prill or non-stick coating is the temperature at and above which the non-stick coated prill or non-stick coating has a greater tendency to adhere or stick to another non-stick coated prill or surface (see Example 1 below for further discussion).

Surfaces referred to herein may include, for example, the interior surface of the prilling vessel and the interior surface of a transportation vessel such as a rail car.

A person of skill in the art will appreciate that, in certain embodiments, although non-stick coated prills and non-stick coatings described herein may have reduced adhesion to another non-stick coated prill or surface, it is possible that at least some adhesion may still occur. By way of example, in certain embodiments, some portions of a non-stick coated prill may adhere to other non-stick coated prills or surfaces, some non-stick coated prills within a larger set of non-stick coated prills may adhere to other non-stick coated prills or surfaces, or a combination thereof. Despite the occurrence of such adhesion, the non-stick coated prills may still be substantially free flowing into and out of transportation vessels, and may still allow for reduced vessel clean-up. Adhesion may be substantially lessened or even eliminated at temperatures below an adhesion temperature of the non-stick coating.

Figure 2:
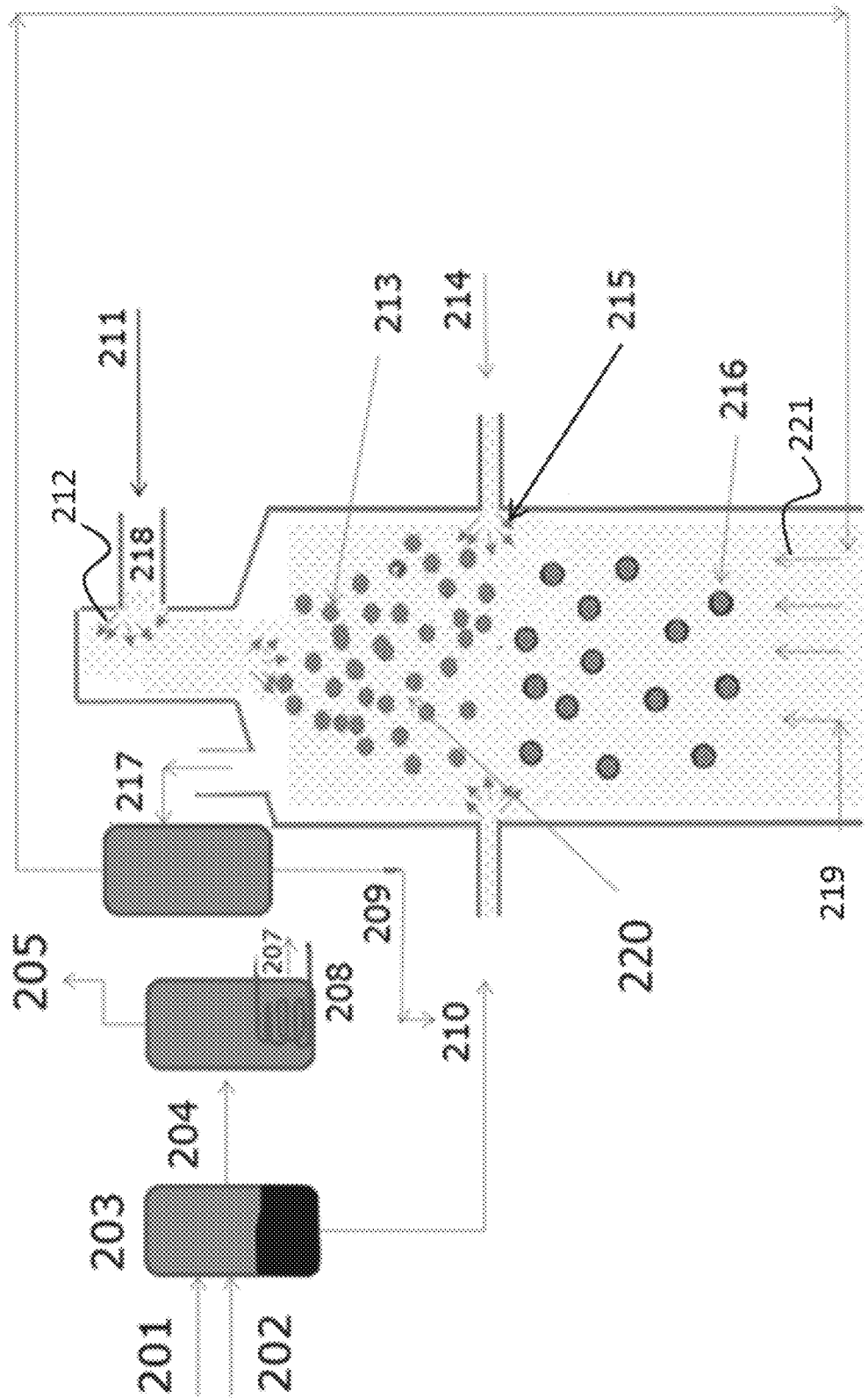
FIG. 2 shows another schematic illustrative of another embodiment of an apparatus suitable for carrying out methods for generating a non-stick coated prill.
Figure 3A:
FIGS. 3A-D show photographs of an embodiment of an apparatus suitable for analyzing an adhesion temperature of asphaltenes.
Figure 3B:
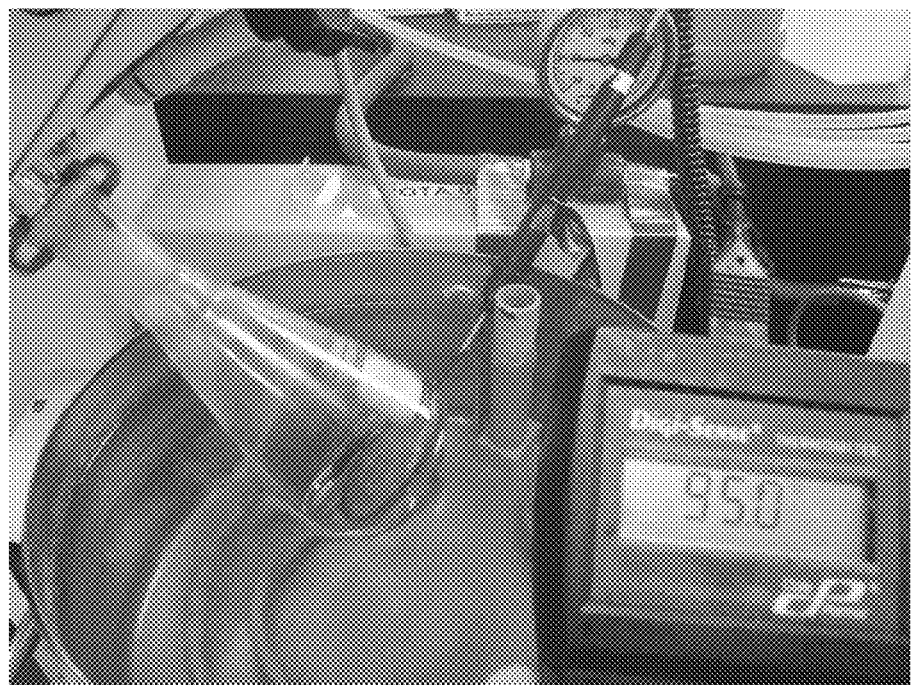
Figure 3C:
Figure 3D:
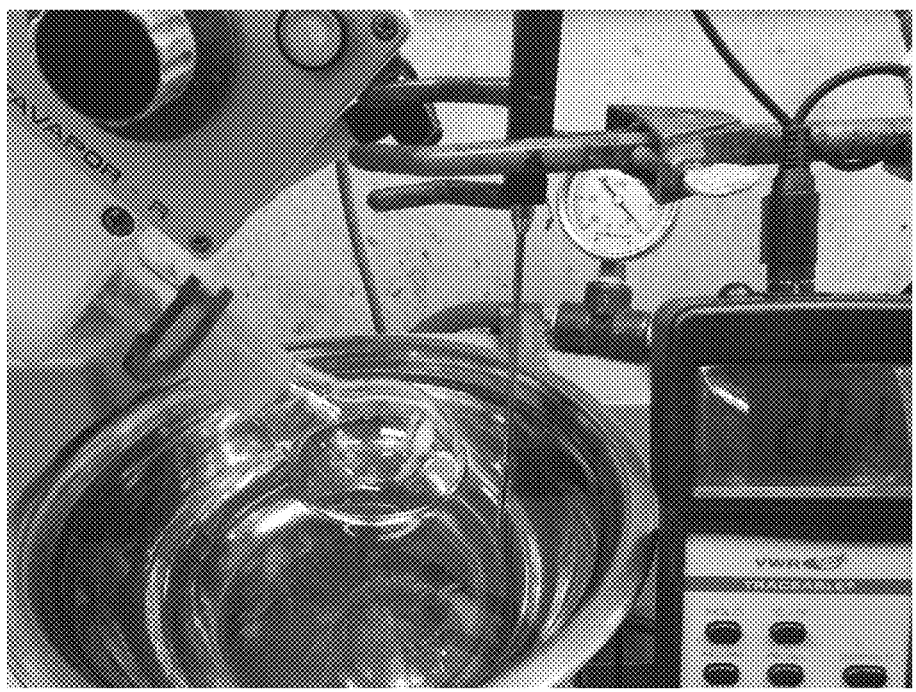

Another example of a prilling apparatus and method for producing non-stick coated prills in accordance with embodiments of the present invention is described with reference to the illustrative schematic provided in FIG. 2. In the illustrated schematic, bitumen (201) is mixed with a solvent (202) such as, for example, pentane, and solvent deasphalted in a solvent deasphalter (SDA) (203) using a deasphalting process such as, for example, KBR's ROSE (Residuum Oil Supercritical Extraction) process. It will be understood by a person of skill in the art that solvent deasphalting may not remove 100% of asphaltenes from DAO, and that DAO may still comprise some asphaltenes in certain embodiments. A mixture of deasphalted oil (DAO) and solvent (i.e., pentane) (204) is recovered from the SDA and further treated in a stripper/heater (208) to recover solvent (i.e., pentane) (205) from the DAO. The DAO (207), which is optionally further mixed with bitumen such as whole bitumen, is then used as a bitumen/DAO feedstock (211) for injection into a prilling vessel via a first inlet (218) positioned at an upper section of the prilling vessel. The first inlet (218) comprises at least one nozzle (not shown), which is for controlling or directing the input of the bitumen/DAO feedstock (211) so as to produce a spray (212) of bitumen/DAO droplets, which form generally spherical or droplet-shaped prill cores (213) which fall through the prilling vessel toward a lower section of the prilling vessel.

As the prill cores (213) fall through the prilling vessel, they are cooled by a countercurrent flow of a carrier gas (221), such as methane, nitrogen, or air, causing the prill cores (213) to become more viscous or even substantially solidify or harden. The carrier gas (221) flows (cycles) through the prilling vessel from one or more second inlets (219) at the lower section of the prilling vessel to one or more first outlets (217) located at the upper section of the prilling vessel. The interior (220) of the prilling vessel provides a low, room, ambient, or otherwise suitable temperature environment to assist with cooling the bitumen/DAO prill cores.

As the bitumen/DAO prill cores (213) fall through the prilling vessel, they encounter one or more third inlets (214), which comprise one or more nozzles (not shown) from which a spray (215) of a non-stick coating material, such as asphaltenes diluted in toluene, is generated. The asphaltenes diluted in toluene coat the bitumen/DAO prill cores, forming non-stick coated prills (216), comprising a semi-solid, highly viscous bitumen/DAO prill core and a non-stick coating. At least some of the toluene from the non-stick coating material mixture of asphaltenes diluted in toluene is evaporated and discharged from the prilling vessel with the carrier gas through the one or more first outlets (217). The toluene is recycled (209) for mixing with asphaltenes (210) obtained from the SDA (203) to generate more non-stick coating material.

Non-stick coated prills (216), produced according to embodiments of the present invention, may comprise a core of a mixture of semi-solid or highly viscous bitumen and DAO and a non-stick coating having reduced adhesion (as previously described above) to other non-stick coated prills, to other surfaces, or a combination thereof. Such surfaces may include, for example, the interior surface of the prilling vessel and the interior surface of a transportation vessel such as a rail car.

As will be understood, the non-stick coating may comprise one or more than one coating or layer. In certain embodiments, a non-stick coating may comprise one, two, or more coatings or layers which may be applied sequentially, simultaneously, or separately. For example, a prilling apparatus used to generate non-stick coated prills may comprise one or more nozzles disposed higher in the prilling apparatus for applying a first coating material, and one or more nozzles disposed lower in the prilling apparatus for applying a second coating material to generate a non-stick coated prill with more than one coating or layer. As a further example, prill cores may be coated with one coating material during the prilling process, and then coated with a second coating material in a subsequent process step comprising dipping the coated prill cores in the second coating material. In yet another example, prill cores may pass through the prilling apparatus more than once, resulting in more than one coating being applied to the prill cores.

A non-stick coating may comprise one or more than one coating material. A non-stick coating may comprise one or more coating materials that alone are not non-stick, but that in combination have non-stick properties. A non-stick coating may comprise a non-stick coating material and a coating material that alone is not non-stick. A non-stick coating may be applied once or more than once. In certain embodiments, a non-stick coating may surround the prill core and provide solidification properties, hardening properties, containment properties, or a combination thereof, in addition to non-stick properties. In certain other embodiments, solidification, hardening, containment, and/or non-stick properties may be provided by different or multiple coatings. In certain other embodiments, a combination of two or more coatings or layers may provide solidification properties, hardening properties, containment properties, non-stick properties, or a combination thereof. By way of example, a non-stick coating may comprise a solidified asphaltenes layer (for example, solidified from an asphaltenes solution) about the exterior of a prill core for providing structural stability, and a powdered asphaltenes layer external to the solidified asphaltenes layer to provide further non-stick character.

The non-stick coated prills may, in certain embodiments, have a diameter of about 0.1 mm to about 1 cm, or a diameter of about 2 mm, or a diameter of less than about 2 mm. The skilled person having regard to the teachings herein will recognize that the non-stick coated prills described herein may be substantially uniform in size, or may have a substantially normal distribution of sizes, or may vary somewhat or significantly in size. In certain embodiments, for example where particles do not have a substantially uniform size, the person of skill in the art will understand that references to sizes herein will, where appropriate, be understood as references to average or mean particle size, mode particle size, or median particle size, or to the size of at least one individual particle.

In another embodiment, the thickness of the non-stick coating of the non-stick coated prills may be uniform, substantially uniform, or non-uniform. In still another embodiment, the coverage of the prill core by the non-stick coating may be uniform, substantially uniform, or non-uniform about the exterior of the prill core.

In further embodiments, the non-stick coated prills may be substantially spherical or droplet-shaped, although the skilled person will recognize that other shapes may be possible.

The person of skill in the art will recognize that the size, shape, or both the size and shape of the non-stick coated prills may affect the flowability, packing efficiency, or a combination thereof of the non-stick coated prills. By way of example, smaller spherical prills may pack more efficiently than larger spherical prills, due to less wasted interstitial space between prills. The skilled person having regard to the teachings herein will be able to select a suitable size, shape, or size and shape according to the particular application parameters and conditions, and is not limited by those specifically enumerated above.

In certain embodiments, the non-stick coating of the non-stick coated prills may be thin. To maintain prill integrity/stability and non-stick properties, the person of skill in the art having regard to the teachings provided herein will be able to determine a suitable non-stick coating thickness depending on, for example, the particular application conditions and parameters or the particular coating material being used. In certain embodiments, the non-stick coating may have a thickness of about 1 µm or less. In certain examples, the non-stick coating may represent about 0.2% of the radius of the non-stick coated prill, for example, a 1 µm non-stick coating on a prill having a 0.45 mm radius. In certain other examples, the non-stick coating may represent about 0.3% by volume of the non-stick coated prills.

Without wishing to be bound by theory, the person of skill in the art will recognize that in certain examples, the smaller the size of the non-stick coated prill, the larger the weight fraction the non-stick coating may represent. As well, in certain embodiments, the larger the weight fraction the non-stick coating represents, the more stable the non-stick coated prill may be.

The person of skill in the art will recognize that, in certain embodiments, it may be desirable to maintain the thickness of the non-stick coating at a reduced or minimum level while still maintaining the stability of the non-stick coated prills, as this may allow for reduced material requirements, reduced cost, or a combination thereof. As well, reduced non-stick coating thickness may allow for a greater portion of the overall mass, volume, or a combination thereof, of the non-stick coated prills to represent bitumen, DAO, or a combination thereof, which may be beneficial for transportation and/or refining of the non-stick coated prills. Particularly in examples where the non-stick coating is expensive or is expensive to apply, or in examples where the non-stick coating is to be removed, recycled, refined, disposed of, or any combination thereof, following transport of the non-stick coated prills, it may be desirable to use a reduced or minimum non-stick coating. Use of a reduced or minimum non-stick coating may, in certain examples, allow for reducing or avoiding separating the non-stick coating from the non-stick coated prills following transport.

Compared to large bitumen spheres or tablets, the non-stick coated prills described herein may be more easily accommodated by existing rail transport infrastructure designed for similarly-sized grain particles. As well, the non-stick coated prills described herein may be easily loaded into a rail car, unloaded from a rail car, or a combination thereof. The non-stick coated prills described herein may be packed tightly with less wasted volume or interstitial space between non-stick coated prills. The non-stick coated prills may be produced to have a size or diameter that minimizes or optimizes interstitial space while allowing for ease of loading and unloading of the non-stick coated prills to and from a rail car.

It will be understood that the prilling processes described herein may be performed at, for example, an oil sands central processing facility where there is access to land vehicles or rail transportation infrastructure, or at an intermediate rail or marine terminal (for example, sales oil may be transported by pipeline and non-stick coated prills generated at the terminal), or at another suitable location.

Following transport, the non-stick coated prills may be used directly for subsequent processing or refinement, or the non-stick coating may first be recovered from the non-stick coated prills and either used to generate a consumer product, disposed of, or reused. In cases where the non-stick coating was applied as a liquid and is insoluble in the material of the prill core, it may be possible to recover the non-stick coating by heating to the melting point of the coating and performing a separation or other suitable process as would be appreciated by one skilled in the art. In cases where the non-stick coating is not harmful to downstream processes, or where the non-stick coating is very thin or present in trace amounts and thus insignificant to the mass of the overall composition of the non-stick coated prill, recovery of the non-stick coating from the non-stick coated prill may be unnecessary. In certain other embodiments, it may be possible to recover the non-stick coating, which may be re-used to transport more bitumen, DAO, or a combination thereof.

As will be understood, the non-stick coating of the non-stick coated prills may comprise any suitable material which can be used to coat the prill cores, making them at least partially resistant to sticking or adhering to one another, at least partially resistant to sticking or adhering to transportation vessel surfaces, or a combination thereof.

Suitable non-stick coating materials may include, for example, superoleophobic, superhydrophilic, hydrophilic, hydrophobic, or superhydrophobic materials (discussed in, for example, Bhushan et al., 2009, Phil. Trans. R. Soc. A., 367:1631-1672). In certain embodiments, asphaltenes may be used as a non-stick coating material. In still other embodiments, A1 or A2 fractions of asphaltenes may be used as non-stick coating materials. In certain other embodiments, coating materials such as those described in Canadian Patent No. 2,814,240, herein incorporated by reference in its entirety, may be used as non-stick coating materials. By way of example, non-stick coating materials may include inert materials such as poly(methylmethacrylate), coker fines, sulfur, clay, silica, or mixtures thereof, such as those described in Canadian Patent No. 2,814,240. A suitable non-stick coating material may include, for example, a material in which bitumen is not soluble. In certain embodiments, a suitable non-stick coating material may comprise petroleum coke, coal, coal powder, or asphaltene powder.

As will be recognized by the person of skill in the art, an A1 asphaltene fraction may include less soluble or "continental" asphaltenes. The term "continental" will be understood by those of skill in the art to indicate or include asphaltenes with, e.g., fused cyclic structures and few branches. These A1 asphaltenes may tend not to dissolve even in toluene, partly because they agglomerate or form an emulsion. As will also be understood to the person of skill in the art, an A2 asphaltene fraction may include more soluble or "archipelago" asphaltenes. The term "archipelago" will be understood by those of skill in the art to indicate asphaltenes that are easier to break down as compared to "continental" compounds, and having, e.g., fewer fused rings and more branches.

In certain embodiments, a suitable non-stick coating may be water. Following application of water to the prill cores, the non-stick coated prills may be maintained at a temperature below 0° C. to maintain the water non-stick coating in a frozen state.

It will be understood to the person of skill in the art that the non-stick coating may, in certain embodiments, solidify or otherwise harden around the prill core, preventing the non-stick coated prills from adhering to one another or to other surfaces. In certain further embodiments, the non-stick coating may be applied as a liquid or solution, which may then be solidified or frozen by a decrease in temperature.

Non-stick coated prills may be transported in a temperature-controlled environment wherein the temperature is maintained below a pre-determined adhesion temperature of the non-stick coated prills. In examples where the non-stick coating comprises asphaltenes, the non-stick coated prills may be transported at a temperature below, for example, about 162° C. In examples where the non-stick coating comprises A1 asphaltenes, the temperature may be maintained below about 210° C. In examples where the non-stick coating comprises A2 asphaltenes, the temperature may be maintained below about 187° C.

It will be understood that in examples where asphaltenes are used as a non-stick coating material, the asphaltenes may, optionally, be obtained from the bitumen being used to form the prill cores of the non-stick coated prills. Methods and apparatuses for separating asphaltenes from bitumen are well-known to the person of skill in the art. By way of example, several commercial processes may be implemented, as are available in public literature. These processes may include, but are not limited to, UOP's solvent deasphalting process (U.S. Pat. No. 3,830,732); KBR's ROSE process (US patent application publication No. 2011/0094937A1); IFP's Solvahl process (Billon, A., Morel, F., Morrison, M. E., Peries, J. P., 1994. Converting residues with IFP's hyvahl and solvahl processes. Rev. Inst. Fr. du Pet. 49 (05), 495-507); and Foster Wheeler's SDA process (http://www.fwc.com/What-We-Do/Refining/FW-Residue-Upgrading-Technologies/Solvent-Deasphalting.aspx;

Houde, E. J., February 2006. When Solvent Deasphalting is the Most Appropriate Technology for Upgrading Residue. IDTC Conference, London, England). Each of these references is herein incorporated by reference in their entirety. Typical processes may involve mixing whole bitumen with a solvent to separate the soluble part (deasphalted oil) from the insoluble part (asphaltenes).

It will further be understood that application of the non-stick coating material, such as an asphaltenes non-stick coating material, to the prill cores may be accomplished using any of a variety of suitable methods. Coating materials may be applied via, for example, techniques available to the skilled person such as spray-methods, dip-methods, or gas coating-methods (see, for example, Canadian Patent No. 2,814,240). In a spray-type application method, prill cores may be coated with a non-stick coating material which may be applied as a liquid, solid, or a combination thereof, via spraying the liquid, solid, or a combination thereof on the exterior of the prill cores. By way of example, the liquid may be asphaltenes or asphaltenes diluted in a solvent, and the solid may be powdered asphaltenes. In a dip-type application method, prill cores may be may be coated with a non-stick coating material which may be applied as a liquid, solid, or a combination thereof, for example, via dipping, rolling, or agitating the prill cores in a liquid, solid (for example a powder), or a combination thereof. In a gas-type application method, prill cores may be exposed to a gas, causing the exterior of the prill cores to harden, cure, solidify, or chemically transform to produce a non-stick coating. By way of example, the prill cores may be exposed to oxygen, or a hot-blast of oxygen, causing the exterior of the prill cores to oxidize or react to form a non-stick coating. In another embodiment, the gas to which the prill cores are exposed may condense and then solidify on the exterior of the prill cores, thereby coating the prill cores.

A spray-based approach, in which asphaltenes mixed with a solvent such as toluene are applied to prill cores, was described above with reference to FIG. 2. In certain embodiments, during a prilling process at least some of the solvent, such as toluene, may evaporate from the non-stick coating of asphaltenes diluted in solvent. Another example may be a method employing a powder coating, wherein no solvent is required and the asphaltenes may be deposited onto the prill cores as a solid powder (see, for example, U.S. Pat. No. 3,795,504; herein incorporated by reference in its entirety). For example, the prilling vessel may be operated as a fluidized bed, with asphaltene powder suspended by the carrier gas for coating the high viscosity prill cores. In certain embodiments, a prill core may be coated using multiple methods as described herein or using any other suitable methods as understood by a person skilled in the art. Another example of a method for coating the prill cores may comprise diluting asphaltenes using a supercritical fluid, such as supercritical $CO_2$ (see, for example, U.S. Pat. No. 4,923,720; herein incorporated by reference in its entirety). In certain examples, a method employing asphaltenes diluted with some other solvent, such as toluene, to the point where the asphaltenes can be deposited onto prill cores by spray coating may be used. The toluene or solvent may be at least partially evaporated during or after application of the solvent-diluted asphaltenes to the prill core, leaving asphaltenes, or asphaltenes comprising a portion of solvent, as a non-stick coating.

In certain embodiments, prill cores may be coated with a non-stick coating within a prilling vessel using a spray-based technique which applies both liquid and solid coating materials, such as liquid (optionally solvent-diluted) asphaltenes and powdered asphaltenes, powdered coal, or powdered petroleum coke. The powdered coating material may be applied as a "dusting", or using suitable techniques as will be known in the field. In certain embodiments, if a solvent-diluted liquid coating material is applied, such as toluene-diluted asphaltenes, the prill cores may be further coated with solid fine particles such as powdered asphaltenes prior to removal or recovery of the solvent (i.e., toluene).

The person of skill in the art will recognize that a prill core may be coated using any of the coating methods described herein. A non-stick coated prill may be produced in a prilling vessel configured to coat the prill cores using any of the coating methods described herein. Alternatively, a prill core may be produced in a prilling vessel and separately coated using any of the coating methods described herein to produce a non-stick coated prill. The person of skill in the art will recognize that a non-stick coating as described herein may comprise more than one non-stick coating. For example, the same or a different coating material may be applied to the same prill core more than one time. It will further be recognized that multiple types of coating materials may be used on the same prill core. For example, a non-stick coating may comprise both a powder and a coating material which was applied as a liquid. Various combinations of non-stick coating methods and materials are available to the person of skill in the art having regard to the teachings herein and who will understand how to select suitable combinations of methods, materials, or both for particular non-stick coating applications.

EXAMPLES

The following examples are provided for the benefit of the person of skill in the art, and are intended as non-limiting examples for illustrative purposes.

Example 1

Adhesion Temperature Determination

Selection of suitable non-stick coating materials, prilling apparatus conditions and configurations, and temperature considerations during transportation of non-stick coated prills may be affected by the nature and characteristics of the coating materials. Thus, it may be useful to determine the adhesion temperature of the coating materials to be used.

This Example details one possible method which may be used to determine an adhesion temperature, which is described in further detail below with reference to FIGS. 3A-D.

In this Example, the adhesion temperature of asphaltenes, and A1 and A2 asphaltene fractions, was determined as follows:

Asphaltene Preparation

Bitumen from a Christina Lake oil sands facility in Alberta, Canada was dissolved and stirred in a 50 fold excess of n-pentane, then allowed to stand in the dark for 24 hours. All flocculated (precipitated) solids were collected by passing the mixture through a 0.45 micron filter and drying the filter cake to a constant weight. The collected solids represent the $_nC_5$ insoluble asphaltenes and inorganic material. The inorganic material was removed by dissolving the asphaltenes in toluene, filtering through another 0.45 micron filter, collecting the filtrate and evaporating the toluene.

The asphaltenes were further separated into two distinct structural classes via the p-nitrophenol (PNP) charge transfer complex procedure as outlined in Gutierrez (Gutierrez L B et al., Fractionation of asphaltene by complex formation with p-nitrophenol. A method for structural studies and stability of asphaltene colloids. *Energy fuels.* 2001; 15(3): 624-628; herein incorporated by reference in its entirety). The condensed, island structure was designated as A1, while the separated, dispersed, archipelago structure was designated as A2. Asphaltenes, A1, and A2 samples are shown in FIG. 3(*a*).

Any suitable technique or process known to those of skill in the art may be used to separate the A1 asphaltene fraction and the A2 asphaltene fraction. Although a p-nitrophenol method is described above, it will be appreciated that any other suitable known chemical method may be used to separate the A1 asphaltenes from the A2 asphaltenes.

Adhesion Temperature Analysis

Asphaltene particles from each sample were gently rolled in a glass flask. The flask was immersed in a mineral oil bath and the temperature was slowly increased from room temperature. The temperature of the mineral oil bath was monitored with a traceable digital thermometer. The tumbling asphaltene particles were observed at a series of increasing temperature increments. The temperature at which particles were observed to be sticking or adhering to each other was recorded as the adhesion temperature. This procedure was carried out on whole Christina Lake asphaltenes, A1 Christina Lake Asphaltenes, and A2 Christina Lake asphaltenes. An example of this procedure is shown in FIGS. 3(*b*)-(*d*).

Results

Whole $_nC_5$ insoluble asphaltenes adhesion temperature: 162-165° C.

A1 asphaltenes adhesion temperature: >210° C.

A2 asphaltenes adhesion temperature: 187-200° C.

In the case of the A2 asphaltenes, small asphaltene particles coalesced into numerous larger particles, but a single large mass was not observed.

The above data suggests that the whole $_nC_5$ insoluble asphaltenes, A1 asphaltenes, and A2 asphaltenes tested from Christina Lake bitumen may each be used as non-stick coating materials, so long as the transportation temperature experienced by the non-stick coating material does not exceed about 162° C., about 210° C., or about 187° C., respectively.

Example 2

Prilling Vessel Design

Prilling apparatuses, also known as prilling vessels or prilling towers, suitable for preparing non-stick coated prills as described herein may be configured or otherwise adapted to accommodate droplet formation, particle dynamics, and/or transient heat transfer. This example provides one non-limiting example of a suitable design for a pilot scale prilling tower designed to convert 50 bbl/d of bitumen into solid or hardened non-stick coated prills having a bitumen/DAO prill core and a non-stick coating. The effects of several design variables on tower dimensions are described. These considerations are described in further detail below with reference to FIGS. 4-6. It will be understood to the person of skill in the art that various suitable alternatives, modifications, substitutions, or changes will be available to, and understood by, the person of skill in the art having regard to this example.

Assumptions

To simplify the design process and simulations/calculations, the following assumptions/simplifications were made (note that these are not intended as limitations to any of the methods, apparatuses, compositions, processes, embodiments or examples described herein):

1. Constant air and bitumen properties;
2. Constant air temperature (ensured by limiting air temperature change);
3. Negligible heat transfer by radiation;
4. Negligible pressure drop along the tower (estimated at 0.17 kPa);
5. Spherical droplets;
6. Adiabatic tower operation;
7. Ambient pressure tower operation;
8. Negligible interaction of prills (ensured by limiting prill volume fraction);
9. Negligible change in air velocity; and
10. Coating thickness is small and so has negligible effects on prill dynamics.

Droplet Formation

There are several modes by which a liquid breaks up into droplets. These droplet formation regimes are classified by the liquid Weber number ($We_l$, see Equation (1)) and the gas Weber number ($We_g$, see Equation (2)), a ratio of the fluid's inertia and its surface tension [1]:

$$We_l = \frac{\rho_l D_n v_l^2}{\sigma} \quad (1)$$

$$We_g = \frac{\rho_g D_n (v_l - v_g)^2}{\sigma} \quad (2)$$

where $\rho$ is density, $D_n$ is nozzle diameter, v is velocity, $\sigma$ is surface tension, subscript l indicates liquid, and subscript g indicates gas.

At low liquid Weber numbers ($We_l$<8), drops are formed at the tips of a nozzle (like a leaking faucet). This regime is referred to as dripping. The dripping regime creates a relatively uniform particle size distribution but requires low flow rates. When the Weber number is increased such that $We_l$>8 and $We_g$<0.4, a continuous liquid jet is formed. This regime is referred to as jetting. The jet is spontaneously broken up to minimize its surface energy. Droplet size is a function of nozzle diameter and independent of jetting velocity, giving a relatively uniform droplet size distribution. Further increase of the Weber number ($We_g$>0.4) causes aerodynamic effects to accelerate the breakup process. This regime is referred to as wind-induced, and the droplet size is a function of jetting velocity and is thus difficult to control.

For this application, the jetting regime may be desired due to its ability to handle large flow rates while producing monodispersed droplets, although other regimes may be possible. In the jetting regime, vibrations of the fluid column break up the jet into droplets [2]. These vibrations occur naturally at their optimum wavelength, $\lambda_{opt}$ (see Equation (3)), and cause the jet to break up into droplets of volume V (see Equation (4)) [3]:

$$\lambda_{opt} = \sqrt{2\pi} D_n \left(1 + \frac{3\mu_l}{\sqrt{\rho_l \sigma d}}\right)^{0.5} \quad (3)$$

$$V = \frac{\lambda_{opt} \pi D_n^2}{4} \quad (4)$$

where $\mu_l$ is the liquid viscosity.

Figure 5:
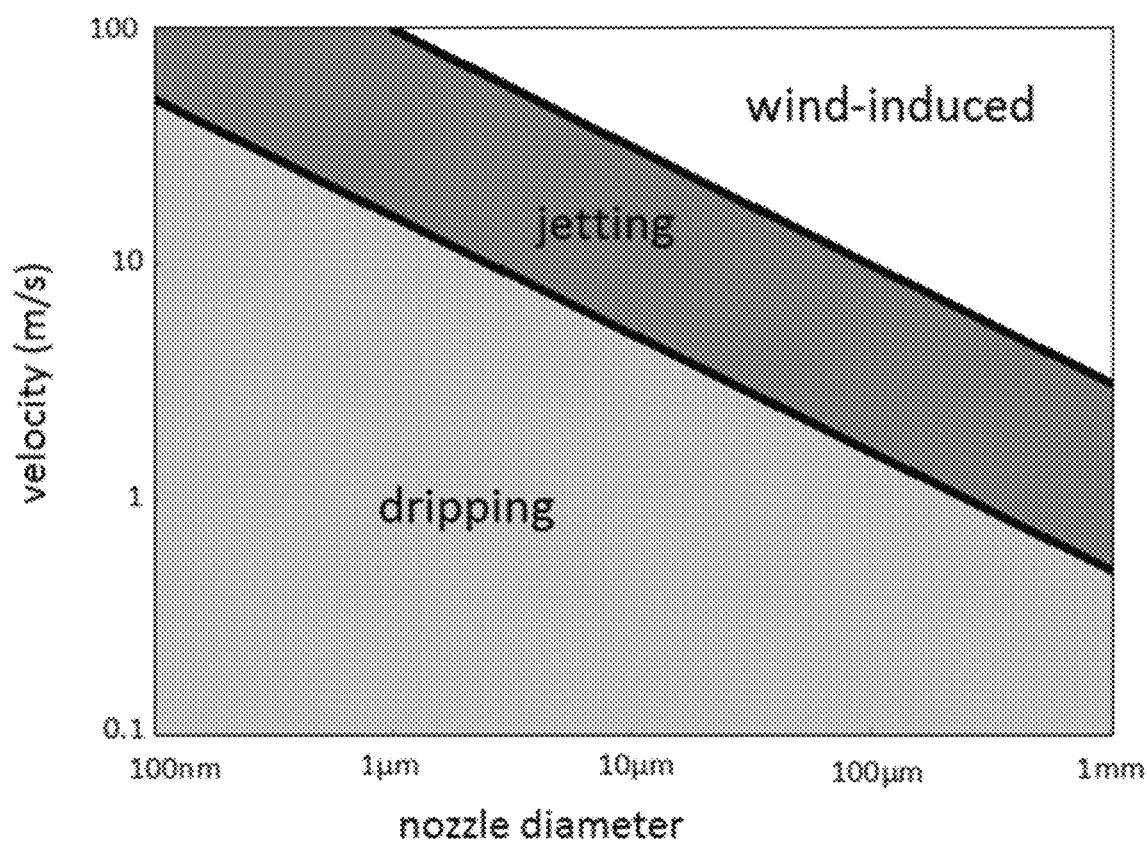
FIG. 5 is a chart showing examples of different droplet formation regimes for bitumen flowing into air. Examples of regimes include dripping, jetting, and wind-induced regimes.

As mentioned above, the droplet size is dependent only on the fluid properties and the nozzle diameter. FIG. 5 outlines the critical velocities for each droplet formation regime for bitumen flowing into air. The lower critical velocity is the velocity at which the liquid Weber number is equal to 8. The upper critical velocity is the velocity at which the gas Weber number is equal to 0.4. The prilling tower of this example was designed to operate at the average of the lower and upper critical velocities, to ensure operation remains in the jetting regime.

Droplet Settling

Figure 4:
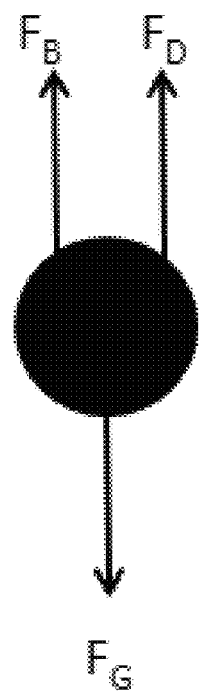
FIG. 4 is a diagram illustrating forces acting on a prill.

Once a droplet is formed, its velocity begins to change from the nozzle velocity to settling velocity. The forces on the prill are shown in FIG. 4.

The force balance on the prill is given in Equation (5):

$$\Sigma F = m_P a_P = F_G - F_B - F_D \quad (5)$$

where $m_P$ is the mass of the prill, $a_P$ is the acceleration of the prill, F is force, subscript G indicates gravity, subscript B indicates buoyancy, and subscript D indicates drag.

The forces can be mathematically expressed in Equations (6), (7), and (8) as:

$$F_G = m_P g \quad (6)$$

-continued $$F_B = \rho_g V_l g \quad (7)$$

$$F_D = \frac{1}{2}\rho_g C_D A_P(v_l - v_g)^2 \quad (8)$$

where $C_D$ is the drag coefficient and $A_P$ is the projected area of the prill. Assuming spherical droplets, substitution of Equations (6)-(8) into Equation (5) yields a differential equation for prill velocity:

$$\frac{dv_l}{dt} = \frac{D_P(\rho_P - \rho_g)g - 0.75 C_D \rho_g (v_l - v_g)^2}{D_P \rho_P} \quad (9)$$

where $D_P$ is the prill diameter.

Perry and Chilton [4] outlined a correlation for drag coefficient, as shown in Equation (10):

$$C_D = \frac{18.5}{Re_p^{0.6'}} \quad 0.3 < Re_p < 1000 \quad (10)$$

where $Re_p$ is particle Reynolds number, given by Equation (11):

$$Re_p = \frac{\rho_g D_p(v_l - v_g)}{\mu_g} \quad (11)$$

Terminal velocity (see Equation (12)) occurs when the prill has zero acceleration; that is, the gravitational force pulling it down is equal to the sum of the buoyancy and drag forces.

$$(v_l - v_g)_{terminal} = \sqrt{\frac{4D_p(\rho_l - \rho_g)g}{3C_D \rho_g}} \quad (12)$$

Due to the dependence of drag coefficient on Reynolds number (and therefore velocity), the terminal velocity must be solved iteratively.

Transient Cooling

Prilling is a dynamic process and the temperature of the prill is changing as it falls through the tower. To simplify the analysis of heat transfer within the tower, a lumped capacitance approach was taken. The temperature of the prill was assumed to be constant at a certain time (temperature gradients within the prill are neglected). This assumption can be verified by the Biot number, a ratio of internal to external heat transfer. The lumped capacitance approach is valid for Biot numbers significantly less than 1. The Biot number for a sphere is given in Equation (13):

$$Bi = \frac{hD_p}{6k} \quad (13)$$

where Bi is the Biot number, h is the convective heat transfer coefficient, and k is the thermal conductivity.

It was further assumed that there is negligible heat transfer due to radiation and that air temperature is constant. The resulting energy balance on the prill is given in Equation (14):

$$\frac{dT_l}{dt} = \frac{-6h}{C_{p,l}\rho_p D_p}(T_l - T_g) \quad (14)$$

where $C_p$ is heat capacity. The Ranz-Marshall correlation (see Equation (15)) [3] can be used to determine the convective heat transfer coefficient for a falling drop:

$$h = \frac{k_g}{D_p}(2 + 0.6 Re_g^{0.5} Pr_g^{1/3}) \quad (15)$$

where Pr is the Prandtl number, given by Equation (16):

$$Pr = \frac{C_p \mu}{k} \quad (16)$$

Obtaining the heat transfer coefficient allows for explicit calculation of the cooling time required to achieve the desired temperature change.

Sizing the Tower

The height of the tower can be determined from the prill terminal velocity and the required cooling time. The tower diameter was calculated based on two constraints: a maximum allowable temperature change for air and a maximum allowable prill volume fraction (the ratio of the volume of prills in the tower at any given time to the internal volume of the tower). Limiting these values ensures the assumptions of constant air temperature and negligible prill-prill interactions are valid. Specifying only one constraint allows for calculation of the tower diameter. The limiting constraint was identified and used for the actual design.

The diameter of the tower (see Equation (17)) can be calculated from the temperature change in air by an energy balance equating the heat gained by the air to the heat lost by the bitumen:

$$D_{tower} = \sqrt{\frac{4\dot{m}_l C_{p,l} \Delta T_l}{\pi \rho_g v_g C_{p,g} \Delta T_g}} \quad (17)$$

where $\dot{m}$ is mass flow rate.

The diameter can be calculated from the prill volume fraction as follows in Equation (18):

$$D_{tower} = \sqrt{\frac{4q_l}{\pi \epsilon (v_l - v_g)_{terminal}}} \quad (18)$$

where q is volumetric flow rate and $\epsilon$ is prill volume fraction.

Equations 17 and 18 can be rearranged to solve for air temperature change or prill volume fraction, respectively. Thus, specifying an air temperature change allows for calculation of the prill volume fraction, and vice versa. The final design was chosen such that both constraints were satisfied.

Design Results

A non-limiting example of a prilling tower was designed for a 50 bbl/d pilot plant. Fluid properties are shown in Table 1, design input parameters in Table 2, and design results in Table 3. Blank inputs indicate that they are not required.

TABLE 1

Fluid Properties of this Non-Limiting Example

| | Bitumen | Air |
|---|---|---|
| Viscosity (Pa · s) | | $1.79 \times 10^{-5}$ |
| Density (kg/m$^3$) | 939 | 1.23 |
| Heat capacity (J/kg · K) | 2,000 | 1,004 |
| Thermal conductivity (W/m · K) | 0.17 | $2.54 \times 10^{-2}$ |
| Surface tension (mN/m) [5]* | | 30 |

*The surface tension of bitumen-air was assumed based on values for other hydrocarbons.

TABLE 2

Design Inputs of this Non-Limiting Example

| | |
|---|---|
| Prill diameter (mm) | 0.90 |
| Initial bitumen temperature (° C.) | 180 |
| Final bitumen temperature (° C.) | 30 |
| Air temperature (° C.) | 15 |
| Air velocity (m/s) | 1.00 |
| Maximum allowable prill volume fraction | 0.10% |
| Maximum allowable air temperature change (° C.) | 5.00 |
| Coating thickness (μm) | 1.00 |

TABLE 3

Design Results of this Non-Limiting Example

| | |
|---|---|
| Nozzle diameter (mm) | 0.55 |
| Nozzle inlet pressure (kPa) | 105 |
| Cooling time (s) | 3.85 |
| Tower height (m) | 13.41 |
| Tower diameter (m) | 2.31 |
| Air flow rate (sm$^3$/s) | 4.18 |
| Change in air temperature (° C.) | 5.00 |
| Prill volume fraction | 0.001% |
| Coating required (bbl coating/bbl bitumen) | 0.0033 |

Figure 6A:
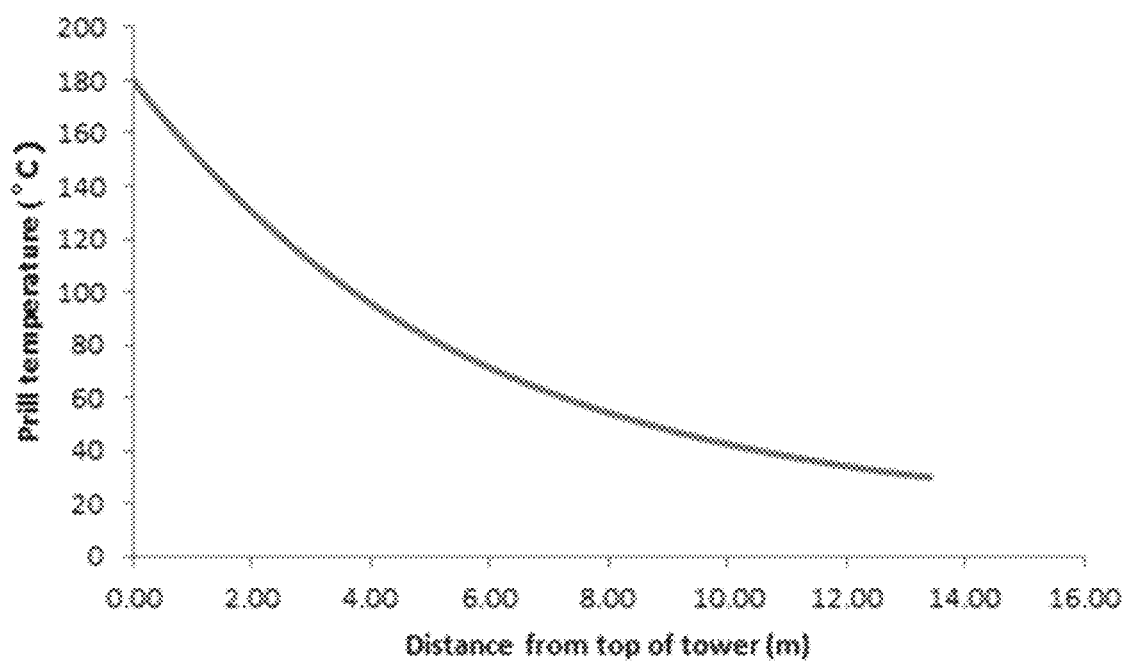
Figure 6B:
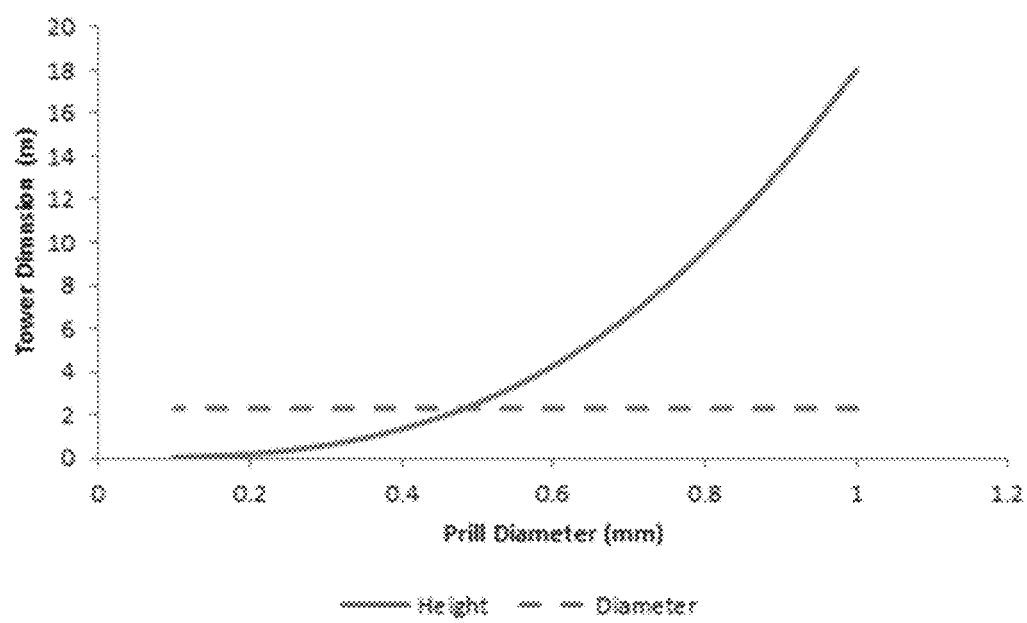
Figure 6C:
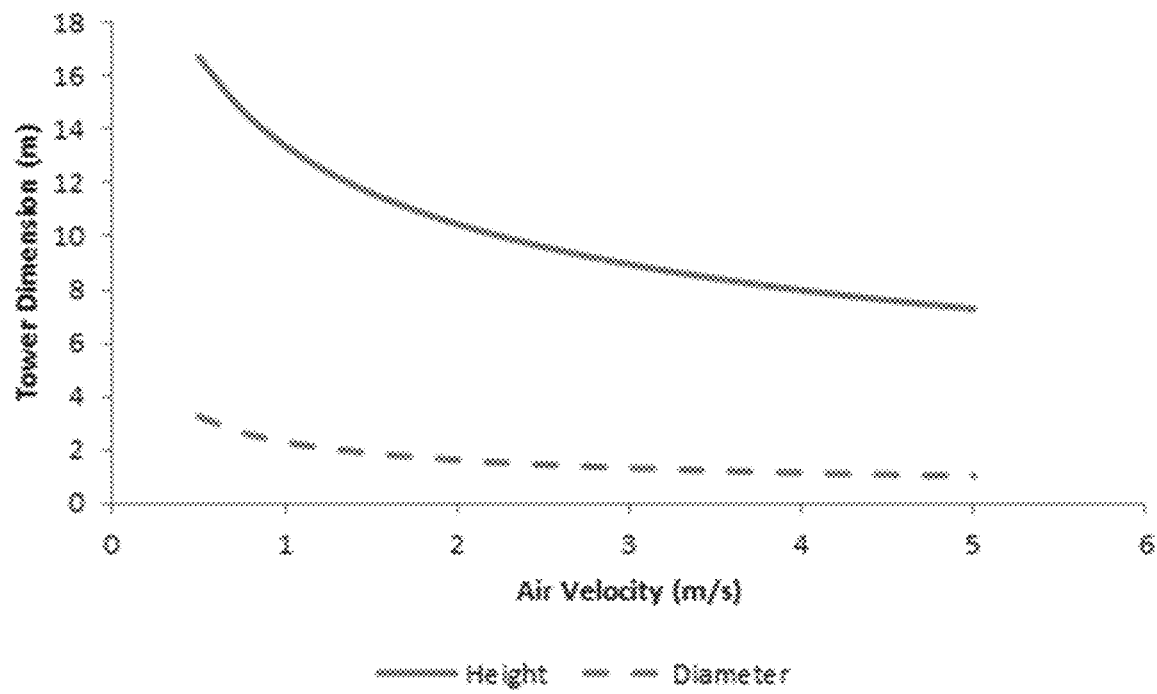

The temperature profile of the bitumen prills as they fall through the tower is shown in FIG. 6A.

Sensitivity Analysis

Figure 6D:
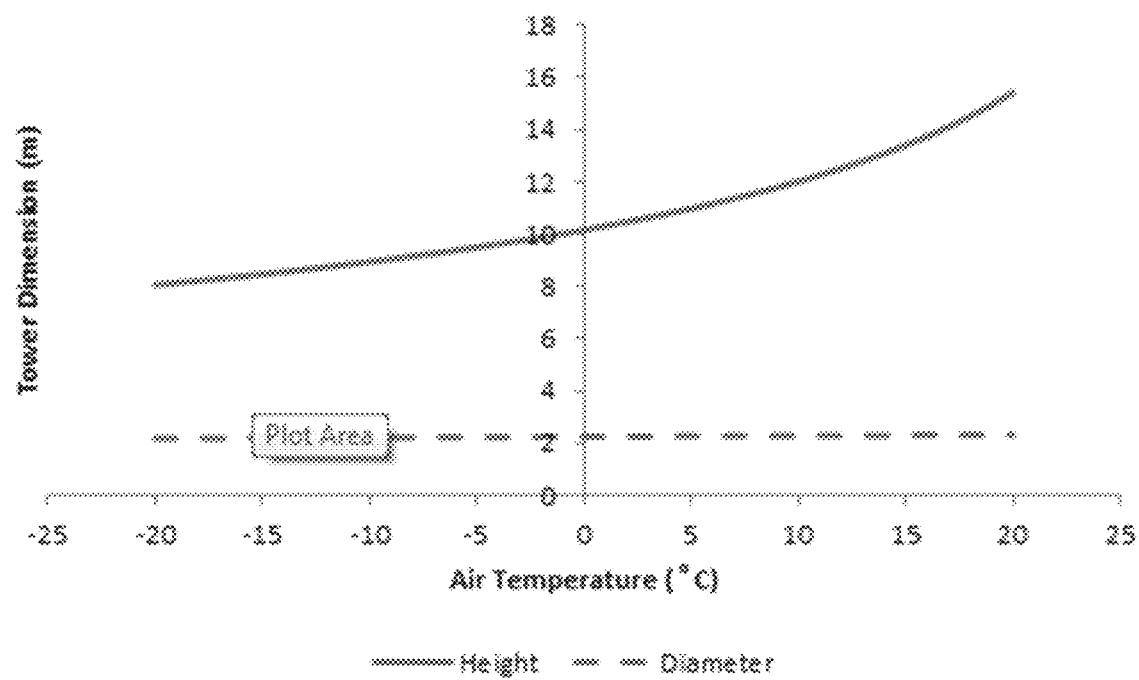

A sensitivity analysis was conducted to determine how the tower dimensions are affected by varying prill diameter (FIG. 6B), air velocity (FIG. 6C), and air temperature (FIG. 6D).

The person of skill in the art will recognize that the design presented in this Example is merely one of many possibilities. Optimization work may be done to determine further cost-effective solutions, and it will be understood that changing the above indicated input parameters may affect capital costs and/or operating costs.

Prilling conditions and prilling tower designs may be further configured to accommodate particular non-stick coatings. For example, calculations may be performed to determine how long the non-stick coating material will take to solidify.

It will further be noted that the non-stick coating volume of this example is small relative to the volume of the prill cores comprising bitumen (0.0033 bbl/bbl for a 1 μm non-stick coating thickness within the current design). If 300,000 bbl/d of bitumen are exported, this amounts to just under 1000 bbl/d of non-stick coating material. Depending on the type of non-stick coating, one option is for it to be removed at the refinery and either treated as waste, refined into a consumer product, or returned for re-use, depending on the economics of each. For example, if the prill cores comprising bitumen are insoluble in the non-stick coating material and the non-stick coating material was applied as a liquid, heating to the melting point of the non-stick coating material may be useful for separating the non-stick coating from the prill cores comprising bitumen. Alternatively, the non-stick coating may be present in such trace amounts that its separation from the prill cores comprising bitumen is not necessary and the non-stick coated prills may be fed through the refinery process. Typically, refineries are designed to handle large amounts of diluent, so trace amounts of non-stick coating material are unlikely to pose a major issue in many cases. Note that prill core and non-stick coating dimensions (e.g., prill diameter) may be adjusted, and thus volumes will change. The examples provided herein are for illustrative and non-limiting purposes. In many cases, the amount of non-stick coating material will be negligible relative to the amount of bitumen being transported in the prill cores.

Methodology for designing a non-limiting example of a bitumen prilling tower has been outlined in this example. Conditions were chosen to provide monodispersed prills with the ability to produce the prills at relatively high rates. A non-limiting embodiment of a design was described for a pilot scale prilling tower to convert 50 bbl/d of bitumen into semi-solid or solid prill cores with a non-stick coating. The example tower cools bitumen from 180° C. to 30° C. with air flowing counter-currently at 15° C. and 1.00 m/s. The example tower is 13.41 m tall and 2.31 m in diameter, with the prills requiring 3.85 seconds to cool and reach the bottom of the tower. Sprayers are employed throughout the tower to apply the non-stick coating.

One or more illustrative embodiments have been described by way of example. It will be understood to persons skilled in the art that a number of variations and modifications can be made without departing from the scope of the invention as defined in the claims.

What is claimed is:

1. An apparatus for preparing a non-stick coated bitumen prill, the apparatus comprising:
   a deasphalter for separating a crude composition into: (i) a first stream comprising asphaltenes, and (ii) a second stream comprising bitumen, deasphalted oil, or a combination thereof;
   a prilling vessel having an upper section and a lower section;
   a first inlet for inputting at least a portion of the bitumen, the deasphalted oil, or the combination thereof, in the upper section of the prilling vessel and forming a prill core;
   a second inlet for inputting a carrier gas to the lower section of the prilling vessel for cooling the prill core;
   a first outlet for discharging the carrier gas from the upper section of the prilling vessel;
   a third inlet for inputting at least a portion of the asphaltenes as a component of a non-stick coating material for coating the prill core; and
   a second outlet for outputting the non-stick coated bitumen prill.

2. The apparatus according to claim 1, wherein the first inlet comprises a nozzle or prilling head.

3. The apparatus according to claim 1, wherein the apparatus is configured to cool the prill core from about 180° C. at the upper section of the prilling vessel to about 30° C. at the lower section of the prilling vessel.

4. The apparatus according to claim 1, wherein the asphaltenes of the non-stick coating material are a powder, a liquid which subsequently solidifies, a solvent-diluted asphaltenes solution which subsequently solidifies, or a combination thereof.

5. The apparatus according to claim 4, wherein the asphaltenes of the non-stick coating material comprise toluene-diluted asphaltenes.

6. An apparatus for preparing a non-stick coated bitumen prill, the apparatus comprising:
- a prilling vessel having an upper section and a lower section;
- a first inlet for inputting bitumen, deasphalted oil, or a combination thereof, in the upper section of the prilling vessel and forming a prill core;
- a second inlet for inputting a carrier gas to the lower section of the prilling vessel for cooling the prill core;
- a first outlet for discharging the carrier gas from the upper section of the prilling vessel;
- a third inlet for inputting a non-stick coating material for coating the prill core; and
- a second outlet for outputting the non-stick coated bitumen prill, wherein the first inlet is configured to input the bitumen, the deasphalted oil, or the combination thereof, in the upper section of the prilling vessel via a nozzle or prilling head having a diameter, $D_n$, and at a velocity, v, that satisfy the following equations:

$$We_l = \frac{\rho_l D_n v_l^2}{\sigma} > 8, \text{ and}$$

$$We_g = \frac{\rho_g D_n (v_g - v_l)^2}{\sigma} < 0.4,$$

wherein:
We represents Weber number,
l represents liquid,
g represents gas,
$\rho$ represents density,
$D_n$ represents diameter,
v represents velocity, and
$\sigma$ represents surface tension.

7. The apparatus according to claim 6, wherein the apparatus is configured to cool the prill core from about 180° C. at the upper section of the prilling vessel to about 30° C. at the lower section of the prilling vessel.

8. The apparatus according to 6, wherein the non-stick coating material comprises asphaltenes as a powder, as a liquid which subsequently solidifies, as a solvent-diluted asphaltenes solution which subsequently solidifies, or a combination thereof.

9. The apparatus according to claim 8, wherein the non-stick coating material comprises asphaltenes as a toluene-diluted asphaltenes.

* * * * *